No. 649,098. Patented May 8, 1900.
R. A. BRINE.
MEANS FOR SECURING TIRES TO WHEELS.
(Application filed Mar. 28, 1900.)
(No Model.)
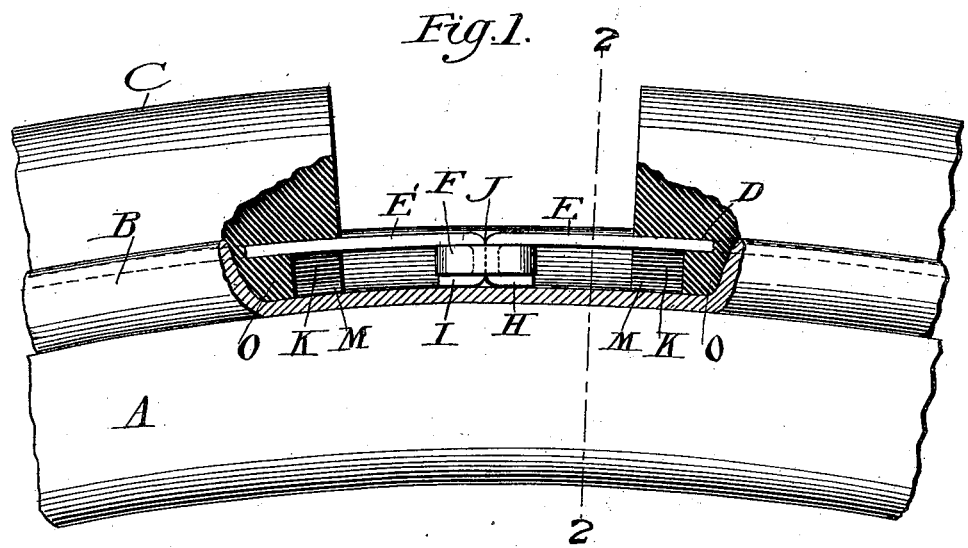
Witnesses
D. W. Edelin.
Chas. H. Baker.
Inventor.
Richard A. Brine.
By J. E. Stebbins
Atty.
THE NORRIS PETERS CO., PHOTO-LITHO., WASHINGTON, D. C.

UNITED STATES PATENT OFFICE.

RICHARD A. BRINE, OF REVERE, MASSACHUSETTS.

MEANS FOR SECURING TIRES TO WHEELS.

SPECIFICATION forming part of Letters Patent No. 649,098, dated May 8, 1900.

Application filed March 28, 1900. Serial No. 10,545. (No model.)

*To all whom it may concern:*

Be it known that I, RICHARD A. BRINE, a citizen of the United States, residing at Revere, in the county of Suffolk and State of Massachusetts, have invented certain new and useful Improvements in Means for Securing Tires Within the Channels of Wheels, of which the following is a specification.

The object of my invention is the provision of improved means for securing solid-rubber tires within the metallic channels of vehicle-wheels, said means to be simple in construction, facile of adjustment, which will not necessitate in its application the mutilation or cutting away of the channel or felly of the wheel, which will not appreciably weaken the rubber tire at the point of union, and which, withal, shall constitute a superior device for performing the requisite functions.

With this end in view my invention consists in certain novelties of construction, formation, and arrangements hereinafter set forth, and pointed out in the claim.

The accompanying drawings illustrate an example of the physical embodiment of the principle of the invention.

Figure 1 is a section of a vehicle-wheel with the ends of the rubber tire separated and showing my improved means for uniting the ends of the tape or band. Fig. 2 is a sectional view of the felly, metallic channel, and tape, taken on line 2 2 of Fig. 1, and also illustrating the shape of the hole or recess made in the rubber tire which is to receive one-half of the fastening means. Fig. 3 is a detached perspective view of the ring and ends of the tape passed through a hole in the ring and bent around the same.

Referring to the several figures of the drawings, the letter A designates the felly; B, the metallic channel; C, the rubber tire; D, the flat metallic tape or securing-band.

E E' are the free ends of the tape.

F is a ring; G, a rectangular hole through the ring.

H and I designate the extreme ends of the tape located beneath the ring and in contact with the metallic channel.

J is the frictional point of contact of the surfaces of the bent ends of the tape where they pass through the hole in the ring.

K K are the recesses made in the ends of the rubber tire to receive the ring.

L L are narrow recesses to receive the ends H and I of the tape, and M M are parts of the rubber tire which fit under the projecting side edges of the ring and lie in contact with the metallic channel.

The method of securing the rubber tire within the metallic channel is as follows: The felly, metallic tire, and rubber tire containing the tape being assembled in the usual way, one end of the tape E is bent and adjusted within the hole of the ring, the tape then drawn around the wheel as tight as is necessary, and the other end thereof, E', bent at right angles, passed through the hole in the ring, and the extreme end turned toward the left through an arc of ninety degrees to a position between the ring and metallic channel. Finally, the ends of the rubber tire are forced together and in contact, the recesses K and L receiving the ring and the bent ends H and I of the tape.

It will be observed that the surfaces of the ends of the tape where they pass through the hole in the ring are in frictional contact at the point J, so that neither end can move and work loose when the wheel is in use; that the extreme ends of the tape H and I after passing through the hole in the ring are turned toward the right and left and lie in contact with the metallic channel and occupy such positions relative to the ring that the sum of the depths or thickness of the ring and the tape equals the depth or thickness of the rubber tire at O between the tape and the metallic channel, and that the ring and extreme ends H and I of the tape are snugly seated within the recesses M and L, made in the ends of the tire, when the ends of the latter are brought together and united.

From the foregoing it is apparent that I have produced a fastening means for securing rubber tires in position which fulfils all the conditions set forth as the object of my invention.

In prior devices for the same general purpose the metallic tire or felly, or both, have been weakened by holes or otherwise mutilated to receive an element of the fastening means, or the rubber tire above the tape has been cut away or recessed, thus diminishing the strength of the tire at the point of union. My improvement obviates all such and other objectionable features of construction, besides possessing the desirable characteristics of simplicity and facility of application.

What I claim as new, and desire to secure by Letters Patent, is—

The combination in a wheel, of a felly, A; a metallic channel, B; a rubber tire, C; a flat metallic tape, D, embedded in the rubber tire and located in the central lower part thereof; and a ring, F, having a hole, G, therethrough; the free ends, E E', of the said flat tape being bent and passed through the hole, G, in the ring and filling the said hole, the extreme ends, H and I, being turned one to the right and the other to the left so as to occupy positions between the ring and the inner surface of the metallic channel and so as to rest in contact with the latter; each end of the said rubber tire being provided with recesses, K and L, to receive the ring, F, and the ends, H and I, of the tape, and the parts, M M, of the rubber tire when the ends of the same are united fitting under the projecting sides of the ring and lying against the edges of the ends, H and I, of the tape; the relative disposition of the elements being such that the sum of the depths or thicknesses of the ring and tape will equal the thickness of the rubber of the tire at O between the tape and metallic channel; as herein shown and set forth.

In testimony whereof I affix my signature in presence of two witnesses.

RICHARD A. BRINE.

Witnesses:
   FRED. H. KIDDER,
   W. E. HARDING.